United States Patent
Baroux

(10) Patent No.: US 10,759,142 B2
(45) Date of Patent: Sep. 1, 2020

(54) METHOD FOR FORMING A FLEXIBLE, THERMAL-BARRIER SHEET PRODUCT, AND ASSOCIATED APPARATUS

(71) Applicant: BLH TECHNOLOGIES INC., Halifax (CA)

(72) Inventor: Daniel Baroux, Nanaimo (CA)

(73) Assignee: BLH Technologies, Inc., Halifax, NS (CA)

( * ) Notice: Subject to any disclaimer, the term of this patent is extended or adjusted under 35 U.S.C. 154(b) by 628 days.

(21) Appl. No.: 14/447,087

(22) Filed: Jul. 30, 2014

(65) Prior Publication Data
US 2016/0031180 A1   Feb. 4, 2016
US 2017/0239910 A9   Aug. 24, 2017

Related U.S. Application Data

(63) Continuation of application No. PCT/CA2013/050064, filed on Jan. 30, 2013.
(Continued)

(51) Int. Cl.
*B32B 5/06*   (2006.01)
*B32B 5/26*   (2006.01)
(Continued)

(52) U.S. Cl.
CPC ............ *B32B 5/06* (2013.01); *B32B 3/02* (2013.01); *B32B 5/26* (2013.01); *B32B 7/08* (2013.01);
(Continued)

(58) Field of Classification Search
CPC ........... B32B 7/02; B32B 27/12; B32B 27/32; B32B 27/34; B32B 2307/738;
(Continued)

(56) References Cited

U.S. PATENT DOCUMENTS 3,664,904 A * 5/1972 Cook ............... B64D 37/06
220/560.02
4,956,218 A * 9/1990 Haining ............... A62C 8/06
169/50
(Continued)

FOREIGN PATENT DOCUMENTS

AU   200232977   10/2002
CA   2 679 952   10/2008
(Continued)

OTHER PUBLICATIONS

McConnell, Sherri. "Four Square Layer Cake Quilt." Jan. 2012. Moda Bake Shop. pp 1-5.*

*Primary Examiner* — Maria V Ewald
*Assistant Examiner* — Ethan Wedemeyer
(74) *Attorney, Agent, or Firm* — Womble Bond Dickinson (US) LLP

(57) ABSTRACT

A method is provided for forming a flexible fire-resistant and thermal resistant sheet product. Such a method comprises securing a first insulation material sheet to a first cover sheet to form a first sheet product portion including a perimeter; securing a second insulation material sheet to a second cover sheet to form a second sheet product portion including a perimeter; and securing the first sheet product portion to the second sheet product portion, at least about the perimeters thereof and such that the first insulation material sheet is disposed adjacent to the second insulation material sheet, to form the sheet product. An associated apparatus is also provided.

11 Claims, 2 Drawing Sheets

Related U.S. Application Data

Figure 1:
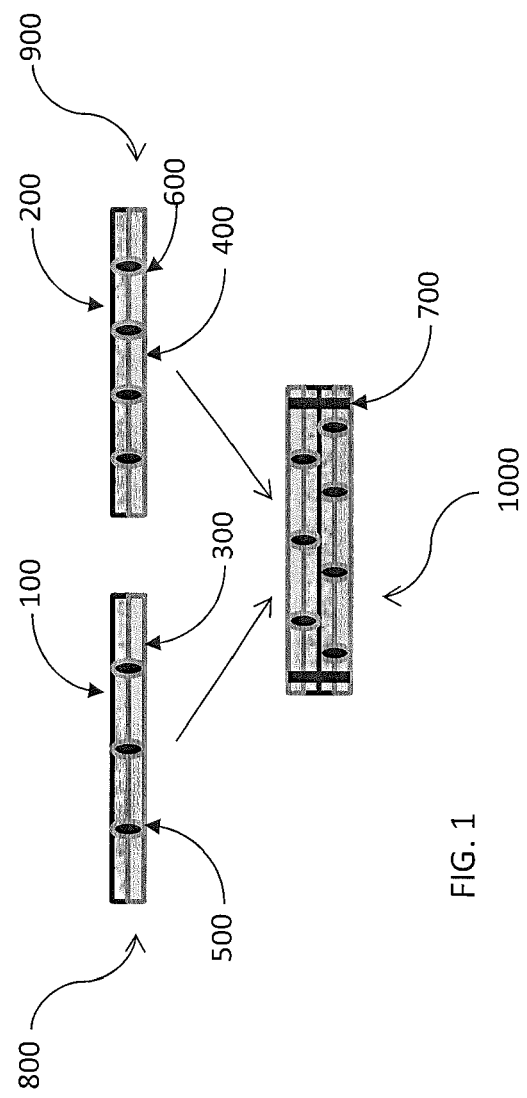

(60) Provisional application No. 61/592,340, filed on Jan. 30, 2012.

(51) Int. Cl.
*D05B 1/04* (2006.01)
*B32B 7/08* (2019.01)
*B32B 33/00* (2006.01)
*B32B 3/02* (2006.01)
*A62C 8/06* (2006.01)
*B32B 37/12* (2006.01)
*B32B 38/00* (2006.01)
*B32B 37/02* (2006.01)

(52) U.S. Cl.
CPC ............ *B32B 33/00* (2013.01); *D05B 1/04* (2013.01); *A62C 8/06* (2013.01); *B29K 2995/0016* (2013.01); *B32B 37/02* (2013.01); *B32B 37/12* (2013.01); *B32B 2038/008* (2013.01); *B32B 2260/04* (2013.01); *B32B 2262/101* (2013.01); *B32B 2307/3065* (2013.01)

(58) Field of Classification Search
CPC . B32B 2457/00; B32B 7/08; B32B 2038/008; B32B 2262/101; B32B 2307/3065; B32B 2250/40; B32B 2250/42; B29C 61/003; B29K 2023/06; B29K 2027/06; B29K 2077/00; A44C 5/12; D05B 1/04; A62C 8/06

USPC .......................... 368/282; 112/412, 475.17
See application file for complete search history.

(56) References Cited

U.S. PATENT DOCUMENTS

| | | | | |
|---|---|---|---|---|
| 5,059,378 | A | * | 10/1991 | Petterson ............... B32B 5/06 156/148 |
| 5,490,567 | A | | 2/1996 | Speer |
| 5,837,621 | A | * | 11/1998 | Kajander ............... C03C 25/26 442/143 |
| 2003/0145773 | A1 | * | 8/2003 | Barney .................... B32B 7/08 112/420 |
| 2004/0097153 | A1 | * | 5/2004 | Bell, III ................... B32B 5/06 442/324 |
| 2008/0090477 | A1 | * | 4/2008 | Balthes ................. B29C 43/003 442/136 |
| 2009/0209155 | A1 | * | 8/2009 | Goulet .................... B32B 5/26 442/234 |
| 2009/0214852 | A1 | | 8/2009 | Kelsey et al. |
| 2010/0119760 | A1 | | 5/2010 | Kirk, II et al. |
| 2013/0180657 | A1 | | 7/2013 | Kelsey |

FOREIGN PATENT DOCUMENTS

| | | | | |
|---|---|---|---|---|
| CA | 2801443 A1 | * | 7/2013 | ............ E06B 9/40 |
| WO | WO 01/43972 | | 6/2001 | |
| WO | WO 2013071393 A1 | * | 5/2013 | ............ C03C 25/10 |

* cited by examiner

METHOD FOR FORMING A FLEXIBLE, THERMAL-BARRIER SHEET PRODUCT, AND ASSOCIATED APPARATUS

CROSS-REFERENCE TO RELATED APPLICATIONS

This application is a continuation of International Application No. PCT/CA2013/050064, filed Jan. 30, 2013, which International Application was published by the International Bureau in English on Aug. 8, 2013, claims priority to U.S. Provisional Application No. 61/592,340, filed Jan. 30, 2012, all which are incorporated herein by reference in their entirety and for all purposes.

BACKGROUND OF THE DISCLOSURE

Field of the Disclosure

Aspects of the present disclosure relate to methods for forming improved thermal barrier sheet products, and, more particularly, to a method for forming a melt-resistant, fire-resistant, and/or otherwise thermally-resistant flexible sheet product, and associated apparatus.

Description of Related Art

Fire blankets or other flexible, and supposedly fireproof or fire-resistant, sheet products are often depended upon to protect life and/or property in case of a fire. Such fire blankets and the like may also be used to smother open flame, for example, in the event of a kitchen or stove fire. In such configurations, the fire blankets may be produced from fibers treated for fire-resistance. Such fibers may include, for instance, cotton fibers, polyester fibers, or the like, or combination thereof. In some instances, such fire blankets may be made from a "fireproof" fabric such as Nomex®, Kevlar®, or the like. However, such fiber- or fabric-based fire blankets may tend to smolder when exposed to flame (particularly fire blankets having a fiber filling), or emit toxic fumes. In addition, even if treated with a fire-retardant, such conventional fire blankets may be prone to "burn through" and may not provide any protection against heat.

Thus, there exists a need for a fire blanket or other flexible sheet having improved ignition/fire- and/or thermal/heat/melt-resistance. Further, such a fire blanket or flexible sheet should provide improved resistance to burn-through and should desirably act as an insulator in the event of a fire. In addition, it would be desirable for such a fire blanket or flexible sheet to not emit toxic fumes upon exposure to heat or flame.

BRIEF SUMMARY OF THE DISCLOSURE

The above and other needs are met by aspects of the present disclosure, wherein one such aspect relates to a method of forming a flexible fire-resistant and thermal resistant sheet product. Such a method comprises securing a first insulation material sheet to a first cover sheet to form a first sheet product portion including a perimeter; securing a second insulation material sheet to a second cover sheet to form a second sheet product portion including a perimeter; and securing the first sheet product portion to the second sheet product portion, at least about the perimeters thereof and such that the first insulation material sheet is disposed adjacent to the second insulation material sheet, to form the sheet product.

In some aspects, the insulation material sheets may comprise filiform glass fibers, and the filiform glass fibers and/or the cover sheets may be interacted with a fire-retarding solution. The material securing the insulation material sheets to the respective cover sheets may also be interacted with the fire-retarding solution, and well as the material securing the first and second sheet product portions together. The fire-retarding solution may be an aqueous fire-retarding solution. It may be preferred that the fire-retarding solution be non-toxic and/or have a neutral pH and/or be hypoallergenic and/or have any number of otherwise desirable properties. In some aspects, the fire-retarding solution may comprise any one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

As such, aspects of the present disclosure provide a fire blanket or other flexible sheet having improved ignition/fire- and/or thermal/heat/melt-resistance; a fire blanket or flexible sheet having improved resistance to burn-through and a capability to act as an insulator in the event of a fire; and a fire blanket or flexible sheet which does not emit toxic fumes upon exposure to heat or flame.

Aspects of the present disclosure thus address the identified needs and provide other advantages as otherwise detailed herein.

BRIEF DESCRIPTION OF THE SEVERAL VIEWS OF THE DRAWING(S)

Figure 2:
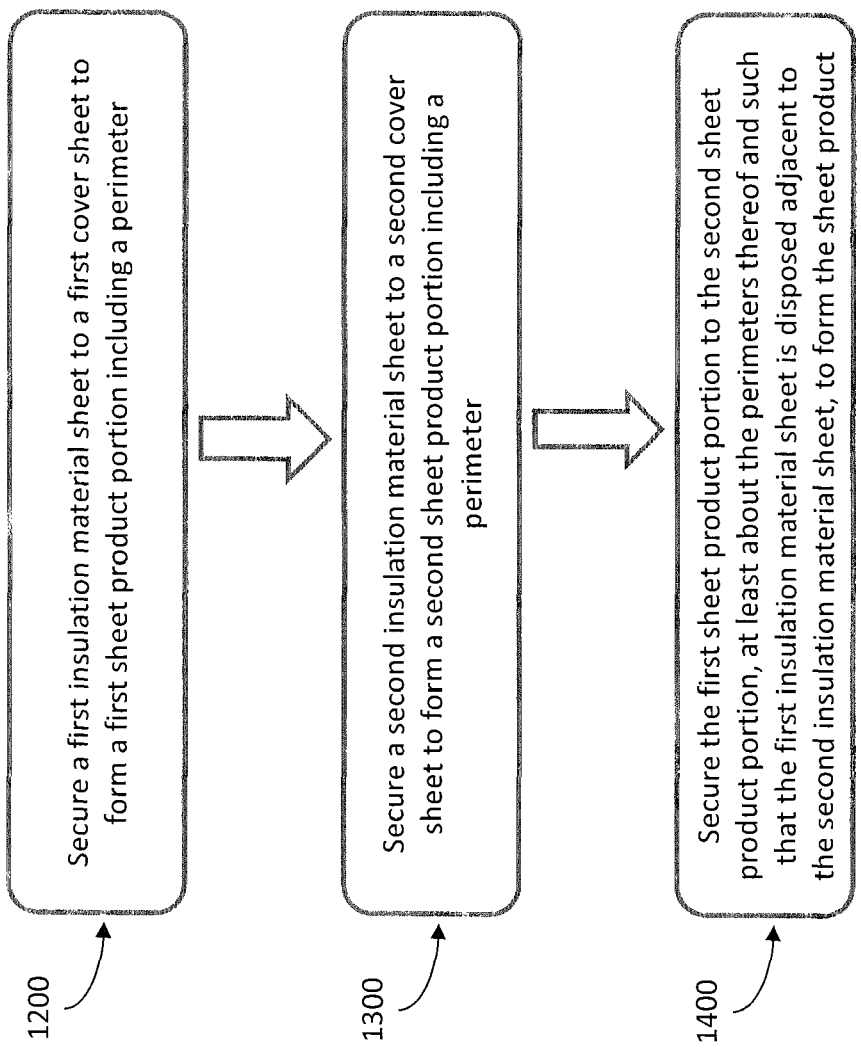

Having thus described the disclosure in general terms, reference will now be made to the accompanying drawings, which are not necessarily drawn to scale, and wherein:

FIG. 1 schematically illustrates an apparatus for forming a flexible fire-resistant and thermal resistant sheet product, according to one aspect of the disclosure; and FIG. 2 schematically illustrates a method of forming a flexible fire-resistant and thermal resistant sheet product, according to one aspect of the disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Aspects of the present disclosure are generally directed to apparatuses and methods for forming a flexible, thermal-resistant sheet product. In one such aspect, the sheet product may be termed a fire blanket. As previously discussed, possible limitations in the treatment of as-formed filiform glass fiber products, such as a glass fiber-based insulation or board product, for fire resistance, particularly with a liquid fire retardant, include difficulty in achieving an even and consistent treatment of that glass fiber product, as well as difficulty in effecting thermal/heat resistance in the as-formed product. That is, the result of some fire resistance surface-treatment processes may be an uneven, non-uniform, or otherwise inconsistent or incomplete application of the fire retardant to the glass fiber product. In those cases, such uneven surface treatment may result in varying levels of fire resistance of the treated glass fiber product which may, in turn, become a hazard in the event of a fire which the product is intended to retard or otherwise provide some resistance. Moreover, such surface fire-retardant treatments may have little effect on the overall thermal/heat resistance of the as-formed product.

As such, one aspect of the present disclosure is generally directed to apparatuses and methods for forming an ignition-resistant (fire-resistant) and/or melt-resistant (thermal-resistant) filiform glass fiber product. Filiform glass fibers may be first combined with a fire-retarding solution so as to at least saturate the filiform glass fibers. The filiform glass fibers may be comprised of, for example, E-glass (i.e., alumino-borosilicate glass with less than about 1% w/w alkali oxides), A-glass (i.e., alkali-lime glass with little or no boron oxide), E-CR-glass (i.e., alumino-lime silicate with less than 1% w/w alkali oxides), C-glass (i.e., alkali-lime glass with high boron oxide content), D-glass (i.e., borosilicate glass), R-glass (i.e., alumino silicate glass without MgO and CaO), and/or S-glass (i.e., alumino silicate glass without CaO but with high MgO content). Such filiform glass fibers may be formed, for example, using a direct melt process or a marble remelt process, wherein bulk glass material is melted and then extruded through appropriate bushings or nozzles. In a continuous filament process, a sizing may be applied to the drawn fibers before the fibers are wound. In a staple fiber process, the glass material can be blown or blasted with heat or steam after exiting a formation machine. For example, in rotary process formation machine, molten glass enters a rotating spinner, and due to centrifugal force is thrown horizontally/laterally outward, wherein air jets may push the glass vertically downward while a binder is applied, and wherein a resulting fiber mat may be vacuumed to a screen and the binder then cured in an oven to form a cohesive mat. That is, the rotary or spinner process may be used to make glass wool, wherein the produced fibers fall onto a conveyor belt, where they interlace with each other in a fleecy mass. This can be used for insulation, or the wool can be sprayed with a binder, compressed into the desired thickness, and cured in an oven. The heat sets the binder, and the resulting product may be a rigid or semi-rigid board, or a flexible batt. As such, the filiform glass fibers implemented herein may vary considerably with respect to the applicability thereof to the disclosed process. However, in some aspects, the filiform glass fibers to be combined with the fire-retarding solution may be in "glass wool" or "batt" form.

More particularly, a wetted mixture may first be formed, including the filiform glass fibers and the fire-retarding solution. In some instances, the wetted mixture exclusively includes filiform glass fibers interacted with the fire-retarding solution. The wetted mixture may be formed such that the solids content of the fire-retarding solution is substantially uniformly and thoroughly dispersed therethrough. In some instances, the fire retarding solution may substantially coat each of the filiform glass fibers, wherein the coating includes at least some of the solids content of the fire-retarding solution. The wetted mixture may then be deliquefied, for example, by heating or other suitable drying process, by pressing or compression, via heated circulated air (i.e., air heated with combusted natural gas or other suitable fuel source), or through microwave or infrared drying techniques, to form dry melt-resistant filiform glass fibers. The dry filiform glass fibers may be rendered melt-resistant by the coating of the glass fibers formed by particular solid components of the fire-retarding solution remaining on the glass fibers following the heating/deliquefying/drying process and/or bonding of such solid components to the exposed surfaces of the glass fibers. In such instances, the solid coating may form an insulating barrier capable of diffusing incident heat (i.e., provide thermal/heat/melt resistance for the glass fibers) while also resisting ignition by incident flame (i.e., provide ignition/fire/flame resistance for the glass fibers).

On this basis, according to some aspects, the dry melt-resistant filiform glass fibers themselves may be implemented as a glass fiber end product. For example, the dry melt-resistant filiform glass fibers may be used as blown-in insulation or insulation sheets in bat or roll form. In other aspects, such "pre-treated" filiform glass fibers may be processed, as necessary or desired, in the same of similar manner as previously disclosed herein, so as to prepare pre-treated filiform glass fibers having a particular average length. One skilled in the art will appreciate, however, that the "average length" of the filiform glass fibers disclosed herein do not necessarily require a relatively small or narrow range of fiber lengths. That is, the average length of the glass fibers as used herein is for general guidance only and does not preclude the effectiveness of the methods and apparatuses herein if a relatively large range of lengths of filiform glass fibers is implemented.

Further, in some instances, the glass fibers implemented to form the resulting glass fiber product may be exclusively or substantially exclusively comprised of filiform glass fibers of the type disclosed herein (i.e., excluding materials other than such filiform glass fibers). One skilled in the art will appreciate from the disclosure herein, however, that in some aspects, that contaminants in reasonable levels in the filiform glass fibers will likely have little if any detrimental effect with respect to the resulting as-formed glass fiber product. As such, a decontamination process/apparatus may not necessarily be contemplated (e.g., for the filiform glass fibers), but could be included to perform such decontamination, should there be a need or desire for a contaminant-free glass fiber product.

In some aspects, the fire-retarding solution, used to pre-treat the filiform glass fibers, may comprise, for example, one of a phosphorus compound, a chlorine compound, a fluorine compound, an antimony compound, a halogen compound, an inorganic hydrate, a bromine compound, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof. In this regard, one skilled in the art will appreciate that various fire-retarding or fire resistant substances, either currently known or later developed or discovered, in solution form, may be applicable to the disclosed processes and apparatuses herein within the scope of the present disclosure.

In particular aspects, the fire-retarding solution may be an aqueous fire-retarding solution. It may be preferred that the fire-retarding solution be nontoxic and/or have a neutral pH and/or be hypoallergenic and/or have any number of otherwise desirable properties affecting human/animal and/or environmental safety, while maintaining the necessary efficacy, as implemented and upon exposure of the filiform glass fibers and/or the glass fiber product to heat and/or flame. In some aspects, the fire-retarding solution may include a component which, standing alone, may not necessarily exhibit one or more of the previously-disclosed preferred or desirable properties. However, one skilled in the art will appreciate that other different components of the fire-retarding solution may interact with the noted component so as to neutralize, minimize, or otherwise eliminate, chemically or otherwise, the non-preferred or undesirable properties of the noted component such that the overall fire-retarding solution exhibits one or more of the preferred or desirable properties.

One skilled in the art will further appreciate that the fire-retarding solution may be formed by adding a solid fire-retardant product to a liquid (i.e., water) or other chemical mixed with the filiform glass fibers such that the solid fire-retardant product forms a solution with the liquid or other chemical. In some aspects, the filiform glass fibers may be interacted with the fire-retarding solution such that the fire retarding solution substantially coats each of the filiform glass fibers. In yet another aspect, the fire-retarding solution itself may be configured to substantially coat each of the filiform glass fibers when interacted therewith. In such instances, the fire-retarding solution may interact with the filiform glass fibers, for example, such that the fire-retarding solution or a component thereof etches the exposed surfaces of the glass fibers so as to promote and/or facilitate bonding of particular solid components of the fire-retarding solution with the exposed surfaces of the glass fibers and/or formation of a coating over the exposed surfaces.

In any instance, particular aspects of the present disclosure contemplate that the treated filiform glass fibers are provided in a roll, sheet, or batt form, wherein the filiform glass fibers are sufficiently engaged to form a cohesive member or insulation material sheet. One skilled in the art will appreciate, however, that the filiform glass fibers provided in such configurations do not necessarily have to be tightly compacted, but may be provided as a "fluffed," loose fill, or otherwise relatively loose conglomeration of such fibers in the manner as, for example, a bat or roll of fiberglass insulation, hence an "insulation material sheet."

Once the filiform glass fibers have been treated and dried, the cohesive member/insulation material sheet formed therefrom may be applied to a first cover sheet. Such a first cover sheet may comprise, for example, cotton, polyester, poly-cotton, filfiorm glass fibers, Kraft paper, encasement paper, a foil sheet (aluminum or other metal), or any other suitable sheet member or combinations thereof. In another aspect, a second cohesive member comprised of the treated filiform glass fibers may be applied to a second cover sheet, which may be the same as or different from the first cover sheet. In particular instances, it may be desired for the first and second cover sheets to be comprised of a fibrous material that may also be treated with a fire-retarding solution of the types previously disclosed. In such instances, the fibers may be treated with the fire-retarding solution prior to forming the respective cover sheet, of the as-formed cover sheet may be subjected to a saturating treatment of the fire retarding solution followed by appropriate de-liquefication. The inclusion of the fire-retarding solution in the preparation of the respective cover sheets may facilitate a more ignition/fire- and/or thermal/heat-resistant filiform glass fiber product when applied to the respective cohesive members of the filiform glass fibers.

In one aspect, as shown in FIGS. 1 and 2, each of the first and second cover sheets 100, 200 is secured to the respective cohesive member of the filiform glass fibers 300, 400 (see, e.g., blocks 1200 and 1300 in FIG. 2). Such securement may be accomplished in different manners, as will be appreciated by one skilled in the art. For example, an appropriate adhesive material may be applied between the respective cover sheet and cohesive member. In other instances, particularly when the cover sheets comprise fibrous sheets, the cover sheet may be stitched to the respective cohesive member of filiform glass fibers. When stitched together, the cover sheet/cohesive member may be secured by one or more laterally-extending stitches 500, 600 using a first stitching material. The stitches may extend through the cover sheet and cohesive member and extend laterally about the perimeter and/or between edges. In some instances, point stitches may be used to secure the cover sheet to the cohesive member. Each cover sheet having a cohesive member secured thereto forms, for example, a sheet product portion 800, 900. The first stitching material may comprise any suitable material, as will be appreciated by one skilled in the art. In some instances, the first stitching material may comprise a fibrous material, such as cotton, poly-cotton, filiform glass fibers, or the like, which may also be treated with a fire-retarding solution of the types disclosed herein, also rendering the first stitching material ignition/fire- and/or thermal/heat-resistant.

The first and second sheet product portions 800, 900 are then secured together to form the flexible fire-resistant and thermal-resistant sheet product 1000 (see, e.g., block 1400 in FIG. 2), In so forming the sheet product, the first and second sheet product portions are secured together at least about the perimeters thereof. The first and second sheet product portions are also secured together such that the first and second insulation material sheets are disposed adjacent to each other. In particular instances, the first and second sheet product portions may be secured together by point stitches 700 using a second stitching material. The second stitching material may comprise any suitable material, as will be appreciated by one skilled in the art. In some instances, the second stitching material may comprise a fibrous material, such as cotton, poly-cotton, filiform glass fibers, or the like, which may also be treated with a fire-retarding solution of the types disclosed herein, also rendering the second stitching material ignition/fire- and/or thermal/heat-resistant.

One skilled in the art will also appreciate that, according to some aspects of the present disclosure, the resulting flexible sheet product may be ignition-resistant/melt-resistant due to the ignition-resistant/melt-resistant characteristics of the glass fibers, wherein such ignition-resistance/melt-resistance may be facilitated, in some instances, through heat and/or fire resistance characteristics of the selected cover sheets and stitching or other securement provisions. Further, in some instances, the glass fiber product formed in accordance with aspects of the present disclosure, particularly through treatment of the filiform glass fibers with the fire-retarding solution, may provide a more uniform and thorough dispersion and distribution of the fire-retarding solution within the formed glass fiber product, thus enhancing fire resistance (flame spread), as well as thermal barrier (thermal resistance/insulation) and/or other characteristics of the resulting flexible sheet product.

Many modifications and other aspects of the disclosures set forth herein will come to mind to one skilled in the art to which these disclosures pertain having the benefit of the teachings presented in the foregoing descriptions and the associated drawings. In some instances, other appropriate substances/materials/chemicals may be added to the filiform glass fibers. For example, a mold inhibitor; a water repellant, waterproofing, and/or otherwise water resistant substance may be added to the filiform glass fibers, in addition to the fire-retarding solution. In some instance, the filiform glass fibers themselves may provide a measure of termite resistance, or a separate termite inhibitor may be added. In any instance, it may be preferable that any additional substances received into the filiform glass fibers be suitably introduced so as to be substantially uniformly and thoroughly distributed and dispersed within the filiform glass fibers.

In other aspects, other filiform fibers, whether natural or synthetic/man-made, may be implemented with respect to the methods and apparatuses disclosed herein. For example, such synthetic or man-made fibers may generally be derived from synthetic materials such as petrochemicals, though some types of synthetic fibers may be manufactured from natural cellulose, including but not limited to rayon, modal, and Lyocell™. Cellulose-based fibers may be of two types, regenerated or pure cellulose such as from the cupro-ammonium process, and modified cellulose such as the cellulose acetates. Fiber classification in reinforced plastics may fall into two classes: (i) short fibers, also known as discontinuous fibers, with a general aspect ratio (defined as the ratio of fiber length to diameter) between 20 to 60, and (ii) long fibers, also known as continuous fibers, the general aspect ratio is between 200 to 500.

Mineral fibers may be implemented, in some instances, such as purified natural quartz fibers, silica fiber made from sodium silicate (water glass), and basalt fiber made from melted basalt. Metallic fibers can be drawn from ductile metals such as copper, gold or silver and extruded or deposited from more brittle metals, such as nickel, aluminum or iron. Stainless steel fibers may also be implemented. Carbon fibers may be based on oxidized and, via pyrolysis, carbonized polymers like PAN, though the end product may be almost pure carbon. Silicon carbide fibers can be implemented, where the basic polymers are polymers and not hydrocarbons, and where about 50% of the carbon atoms are replaced by silicon atoms (i.e., poly-carbo-silanes). Polymer fibers based on synthetic chemicals may be made from, but are not limited to: polyamide nylon, PET or PBT polyester, phenol-formaldehyde (PF), polyvinyl alcohol fiber (PVA) vinylon, polyvinyl chloride fiber (PVC) vinylon, polyolefins (PP and PE) olefin fiber, acrylic polyesters, pure polyester PAN fibers used to make carbon fiber, acrylic fiber, aromatic polyamids (aramids) such as Twaron™, Kevlar™, and Nomex™, and elastomers such as Spandex™ or urethane fibers. The disclosed filiform glass fibers may also comprise, in some aspects, microfibers (i.e., sub-denier fiber such as polyester drawn to 0.5 do (Denier)). Generally, microfibers may be ultra-fine fibers (i.e., glass or meltblown thermoplastics) that may be formed, for example, by extruding fiber that is then split into multiple finer fibers.

Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method of forming a flexible fire-resistant and thermal resistant sheet product, said method comprising:
    securing a first insulation material sheet to a first cover sheet, with lateral stitching using a first stitching material, to form a first sheet product portion including a perimeter;
    securing a second insulation material sheet to a second cover sheet, with lateral stitching using the first stitching material, to form a second sheet product portion including a perimeter; and
    securing the first sheet product portion to the second sheet product portion, at least about the perimeters thereof and with a plurality of separate and individual point stitches therebetween, the point stitches being comprised of a second stitching material, such that the first insulation material sheet is disposed adjacent to the second insulation material sheet, the first and second sheet product portions cooperating to form the sheet product;
    wherein the first stitching material is arranged to form lateral stitching and extending only between the insulation material sheet and the cover sheet of each of the first and second sheet product portion.

2. A method according to claim 1, wherein securing the first insulation material sheet and securing the second insulation sheet material each comprise securing the first and second insulation material sheets, each comprised of filiform glass fibers, to the respective first and second cover sheets.

3. A method according to claim 1, comprising interacting at least one of the first and second insulation material sheets and the first and second cover sheets with a fire-retarding solution including one or more of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

4. A method according to claim 1, comprising:
    interacting at least one of the first and second insulation material sheets with a fire-retarding solution; and
    de-liquefying the at least one of the first and second insulation material sheets to form at least one dry melt-resistant insulation material sheet therefrom.

5. A method according to claim 1, comprising:
    interacting at least one of the first and second cover sheets with a fire-retarding solution; and
    de-liquefying the at least one of the first and second cover sheets to form at least one dry ignition-resistant cover sheet therefrom.

6. A method according to claim 1, comprising:
    interacting the first stitching material with a fire-retarding solution; and
    de-liquefying the first stitching material to form dry ignition-resistant first stitching material therefrom.

7. A method according to claim 1, comprising:
    interacting the second stitching material with a fire-retarding solution; and
    de-liquefying the second stitching material to form dry ignition-resistant second stitching material therefrom.

8. A method according to claim 3, wherein interacting at least one of the first and second insulation material sheets and the first and second cover sheets with a fire-retarding solution further comprises interacting at least one of the first and second insulation material sheets and the first and second cover sheets with a fire-retarding solution comprising one of an aqueous fire-retarding solution, a nontoxic liquid fire-retarding solution, and a neutral pH liquid fire-retarding solution.

9. A flexible fire-resistant and thermal resistant sheet, said sheet comprising:
    a first sheet product layered with and secured to a co-extending second sheet product, each sheet product comprising an insulation material sheet layered with a co-extending cover sheet, the insulation material and cover sheets each having a perimeter corresponding to a perimeter of the respective sheet product, the insulation material sheet being comprised of filiform glass fibers and being layered with the co-extending cover sheet, the insulation material sheet and the cover sheet being secured together with a first stitching material arranged to form lateral stitching and extending only between the insulation material sheet and the cover sheet of each of the first and second sheet products, the layered and co-extending first and second sheet products being arranged such that the perimeters thereof are coincident and such that the insulation material sheet of the first sheet product is disposed directly adjacent to the insulation material sheet of the second sheet product, with the layered and co-extending first and second sheet products being secured together about the coincident perimeters thereof with a second stitching material arranged to form a plurality of separate and individual point stitches extending between the respective cover sheets, and such that the layered and secured together sheet products cooperate to form the flexible fire-resistant and thermal resistant sheet, wherein one of the first and second insulation material sheets and the first and second cover sheets, and one of the first and second stitching materials is interacted with a fire-retarding solution including one or more of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

10. A sheet according to claim 9, wherein the first and second cover sheets are comprised of a material selected from the group consisting of cotton, polyester, poly-cotton, filiform glass fibers, Kraft paper, encasement paper, a fibrous material, an aluminum foil sheet or other metal foil sheet, and combinations thereof.

11. A sheet according to claim 9, wherein the first and second stitching materials are comprised of a fibrous material selected from the group consisting of cotton, poly-cotton, filiform glass fibers, and combination thereof.

* * * * *